United States Patent [19]

Hunter et al.

[11] Patent Number: 4,666,758

[45] Date of Patent: * May 19, 1987

[54] LOW TEMPERATURE LAMINATABLE POLYURETHANE

[75] Inventors: Stanley M. Hunter, Simi Valley; Steven I. Oujiri, Palmdale, both of Calif.

[73] Assignee: Sierracin Corporation, Sylmar, Calif.

[ * ] Notice: The portion of the term of this patent subsequent to Jun. 3, 2003 has been disclaimed.

[21] Appl. No.: 856,413

[22] Filed: Apr. 28, 1986

Related U.S. Application Data

[63] Continuation of Ser. No. 616,725, Jun. 4, 1984, Pat. No. 4,592,947.

[51] Int. Cl.$^4$ .................. B32B 7/02; B32B 27/36; C09J 5/02
[52] U.S. Cl. ................... 428/212; 156/106; 156/245; 156/299; 156/309.3; 156/313; 428/220; 428/412; 428/423.1; 428/425.6; 428/426; 523/213
[58] Field of Search .............. 428/412, 214, 212, 215, 428/425.6, 220, 426; 523/213; 156/299, 245, 106, 309.3, 313

[56] References Cited

U.S. PATENT DOCUMENTS

| | | | |
|---|---|---|---|
| 3,350,345 | 10/1967 | Vanderbilt et al. | 523/213 |
| 3,388,032 | 6/1968 | Saunders | 428/215 |
| 3,620,905 | 11/1971 | Abramjian | 428/425.6 |
| 3,657,057 | 4/1972 | Shorr et al. | 428/412 |
| 3,703,425 | 11/1972 | Delmonte et al. | 156/245 |
| 3,764,457 | 10/1973 | Chang et al. | 428/412 |
| 3,900,655 | 8/1975 | Wohlgemuth et al. | 428/214 |
| 4,353,769 | 10/1982 | Lee | 156/299 |
| 4,592,947 | 6/1986 | Hunter et al. | 428/212 |

OTHER PUBLICATIONS

Sierracin/Transtech Brochure, #8,26a/Sie.
Teracol Polyether Glycol, Du Pont, 10/82 2m, Uses in Polyurethanes, Du Pont (1).
Teracol Polyether Glycol, Properties, Uses, Storage, and Handling, Du Pont (2).

*Primary Examiner*—Thomas J. Herbert
*Attorney, Agent, or Firm*—Sheldon & Mak

[57] ABSTRACT

A novel polyurethane can be used to form asymmetrical laminates with glass and plastics such as polycarbonate at temperatures below 150° F. The polyurethane is a reaction product of a diisocyanate, a high molecular weight polyether glycol or polyester glycol, and at least two different diols.

18 Claims, No Drawings

LOW TEMPERATURE LAMINATABLE POLYURETHANE

This is a continuation of application Ser. No. 616,725, filed June 4, 1984, now U.S. Pat. No. 4,592,947.

BACKGROUND OF THE INVENTION

The present invention is directed to laminates comprising polyurethanes.

Thermoplastic polyurethanes are used for preparing safety glass and more complex laminates comprising glass and polycarbonate layers, such as those disclosed in U.S. Pat. No. 3,388,032 to Saunders. One problem in manufacturing assymetrical laminates comprising dissimilar outer layers is caused by the different coefficients of thermal expansion of the layers. For example, plastics usually have a coefficient of expansion 5 to 15 times that of glass. Prior art polyurethane formulations require a laminating temperature of 200° F. or more. Three-layered laminates using layers of dissimilar materials can not be manufactured using prior art polyurethane formulations, because the product laminate tends to warp on cooling from 200° F. to room temperature. This is particularly a problem for thin laminates less than ¼ inch thick. Polyurethanes capable of laminating at low temperatures have not been used because they tend to easily peel away from polycarbonate and glass.

To overcome this problem of distortion resulting from high lamination temperature, thick laminates are used. For example, Saunders suggests the use of a five layer, laminated glass article which comprises a sheet of polycarbonate, two sheets of polyurethane, and two sheets of glass. However, this laminate is difficult to manufacture, has high material costs, and is unavailable in thin sheets for applications such as ¼ inch safety glass for jeweler's cases. Another problem with the Saunders laminate is that the glass layer can shatter.

Thus, it would be desirable to have a polyurethane that is capable of lamination at low temperatures, where the polyurethane is optically clear and has sufficient strength for forming strong laminates with glass, polycarbonate, and other materials used in light transmitting laminates.

SUMMARY OF THE INVENTION

The present invention is directed to a polyurethane that satisfies this need, and laminates formed from the polyurethane. The polyurethane preferably is substantially colorless, optically clear, and is capable of laminating at a temperature below about 150° F. and a pressure below about 200 psig.

The polyurethane is prepared by reacting (a) a high molecular weight polyether glycol or polyester glycol melting below 120° F., and having a molecular weight of from about 500 to about 3,000, (b) at least two diols, (i) a first diol having a molecular weight of from about 60 to about 250, the first diol being symmetrical, i.e. reinforcing, and (ii) a second diol having a molecular weight of from about 60 to about 250, the second diol being different from the first diol; and (c) diisocyanate, in an equivalent amount substantially equivalent to that of (a)+(b), the proportions of (a) and (b) being such that 30 to 60% of the functional —OH groups are from the polyether glycol or polyester glycol (a). Preferably from 40 to 70% of the functional —OH groups are provided by the two diols with the second diol providing about 10 to about 60% of the total hydroxyl groups provided by the two diols.

The polyurethane does not delaminate from glass or polycarbonate at room temperature at 2 pli and preferably delaminates from glass or polycarbonate at 160° F. at a rate of less than 1 inch per hour at 12 pli.

The polyurethane can be used for forming a light transmitting article that is capable of transmitting at least 8%, preferably at least 50%, and more preferably at least 85% of visible light. The article comprises a layer of this polyurethane sandwiched between a layer of a first material and a layer of a second material, where the first and second materials can be the same or different, and are selected from the group consisting of glass, plastics other than the polyurethane, and ceramics. The polyurethane has a shore A hardness of at least about 60.

In an exemplary version of a light transmitting article according to the present invention, the laminate is asymmetrical, with the coefficient of thermal expansion of the first material being at least about 5 times the coefficient of thermal expansion of the second material within a temperature ranges of from 100° to 200° F. For example, the first material can be polycarbonate and the second material glass. By using the polyurethane of the present invention, a light transmitting article that is flat or curved and only about ¼ inch in thickness can be formed without any distortion.

This laminate can be used to replace ¼ inch plate glass in applications where break resistance is desirable, such as in jewelry display cases. Further, this laminate can be used in applications where a thin layer is required and it is undesirable that users be exposed to shattering glass. When the laminate is used as a window, the polycarbonate, which does not shatter or spall, can be placed facing the user.

The polyurethane can also be used to form nondistorting thick laminates for applications such as bullet proof glass.

DESCRIPTION

The goal of this invention is to provide a polyurethane having a laminating temperature below 150° F., and having physical and optical characteristics rivaling those of the best of existing polyurethanes that laminate only at high temperatures.

Polyurethanes according to the present invention are capable of laminating to other materials such as glass and polycarbonates at a temperature below about 150° F. and a pressure below about 200 psig. By the term "capable of laminating" there is meant that the polyurethane passes the room temperature delamination test described below where no delamination occurs at 2 pli (pounds per linear inch) at room temperature. During this test, primers such as silane primers can be used. The polyurethane has a shore A hardness of at least about 50, and preferably at least about 70 to form a strong laminate.

The polyurethanes are formed by reacting (a) a high molecular weight glycol melting below 120° F. and having a molecular weight of from about 500 to about 3,000; (b) at least two different diols, at least one of the dils being symmetrical; and (c) a diisocyanate preferably aliphatic. The polyurethane is preferably thermoplastic for extrusion to form sheets for lamination. However, it can be thermosetting.

The thermoplastic polyurethanes can be prepared by reacting the organic polyisocyanate with the high molecular weight polyol and the two relatively short chain diols until a solid, but still thermoplastic material, is obtained.

The long chain, relatively high molecular weight polyol can be a polyoxyalkylene ether glycol or a polyester glycol having a melting point below about 120° F., and having a molecular weight of about 500 to 3,000. The polyols used preferably have two labile hydrogen atoms per molecule but can have 3 or more when a thermoset polyurethane is used. Glycols having a molecular weights of about 600 to 2,000 are especially effective in giving high quality polyurethanes.

Illustrative of suitable polyoxyalkylene ether glycols are poly-1,2-propylene ether glycol, poly-1,3-propylene ether glycol, and polybutylene ether glycol. Polyoxyalkylene ether glycols can be prepared from polymerized epoxides or cylcic ethers.

Polyethers are of two basic types—those derived from THF, such as TERACOL TM polyether glycols, and those derived from propylene oxides, such as polypropylene ether glycol and related polyols. Polyurethanes prepared from polyethers derived from THF are generally tougher and more resistant to degradation than polyurethanes prepared from polyethers derived from propylene oxides.

Suitable polyester glycols include polycaprolactones; poly(butylene adipates); poly(butylene azelates); and polyesters based on polycarboxylic acids, such as adipic, oxalic, phthalic, sebacic, succinic and terephthalic acids and the like, in reaction with low molecular weight glycols such as ethylene glycol, propylene glycol, diethylene glycol, 1,4-butanediol, and 1,6-hexanediol and the like.

The two low molecular weight diols preferably have only primary and secondary aliphatic hydroxyl groups. At least one diol is reinforcing, and preferably both are reinforcing. Reinforcing diols have the following characteristics: (a) symmetry; (b) a relatively low molecular weight; and (c) six or less carbon groups exclusive of aromatic radicals. Diols containing aromatic nuclei are frequently reinforcing. Non-reinforcing diols generally are branched compounds and are free of aromatic nucleii.

Illustrative reinforcing diols include 1,4-butanediol, ethylene glycol, diethylene glycol, 1,2-propanediol, 1,3-propanediol, neopentyl glycol, cis or trans 1,4-dihydroxycyclohexane, hydroquinone, and 1,4-(B-hydroxyethoxy)benzene. Illustrative of non-reinforcing diols are 1,3-butanediol, 2-methyl-2-ethyl-1,3-propanediol, 2-methyl-butanediol,-1,4, and 2-butyl-2-ethylpropanediol-1,3.

The low molecular weight diols used in the formulation are different from each other. For example, they can differ in molecular weight and/or structure. Generally they are different in molecular weight, differing by at least 14. Because two different diols are used, low temperature lamination is possible. Reinforcing and symmetrical 1,4-butanediol and ethylene glycol are especially preferred because of their low toxicity and ease of handling. Further, using both 1,4-butanediol with ethylene glycol as the diols, a high strength laminate can be formed at a lower laminating temperature than if either of the diols were used by itself. Also, an overall physical strength comparable to that of some of the best single curative polyurethane can be obtained with a multi-diol system.

Thermoplastic polyurethanes based on aromatic diisocyanates often are slightly colored at the time of preparation and usually yellow with aging. Therefore, the diisocyanate used in the polyurethane preferably is aliphatic.

The aliphatic diisocyanate can be methylene bis(4-cyclohexylisocyanate), marketed by Mobay Chemical Company under the tradename of Desmodor W TM, 1,4-butane diisocyanate, 1,2-isocyanatomethyl cyclobutane, 1,6-hexamethylene diisocyanate, 1,4-cyclohexane diisocyanate, 4,4-diicyclohexylmethane diisocyanate, 1,10-decane diisocyanate, and the like.

By formulating the curative with a combination of two low molecular weight diols, it is possible to manufacture a polyurethane with a low laminating temperature. Further the polyurethane retains all the desirable physical qualities of a polyurethane using a single reinforcing diol, including strength, optical clarity, and absence of discoloration on aging. A lower laminating temperature is achieved by disrupting the polymer chain with a second curative diol. The molecular weight of the diols differs by at least 14, i.e. one $CH_2$ group. Preferably one diol has a molecular weight of from 76 to 250 and the other diol has a molecular weight of from 62 to 236. The overall strength of the polyurethane is retained, even with a low lamination temperature, by using a higher ratio of curative to soft segments than in a single curative system. Optical clarity and resistance to yellowing can be obtained by using an aliphatic diisocyanate.

The mole ratio of low molecular weight curative diols to the high molecular weight soft segment glycol is important in preparing the polymers of this invention. To achieve a polyurethane that laminates below 150° F. and has sufficient hardness and strength to form a strong laminate, from about 30 to about 60%, and preferably 30 to 50%, of the functional hydroxyl groups are provided by the high molecular weight glycol and from about 40 to about 70% of the functional hydroxyl groups are provided by the diols. Further, preferably the non-reinforcing diol, or if there is no non-reinforcing diol, the lower molecular weight diol of the two diols, provides from about 10 to about 60%, preferably from about 30 to about 50% of the total hydroxyl groups provided by the two diols, i.e. the lower molecular weight diol provides from about 4% to about 42% of the total hydroxyl groups used in the polyurethane and the higher molecular weight diol provides from about 28% to about 66% of the total hydroxyl groups used.

The polyurethane can include a UV-absorber such as benzophenones or benzotriazoles. Preferably the polyurethane includes antioxidants such as hindered phenols such as Irganox 1010, 1035, 1076, 1093, 1-98 (available from Ciba Geigy); hindered amines; organic phosphites and such as alkyl and aryl phosphites and phosphates; and quinones.

The polyurethane polymers of this invention can be prepared by one shot, quasi-prepolymer, or full prepolymer procedures. In the one shot procedure, the isocyanate, high molecular weight glycol, and the two low molecular weight diols are mixed together and reacted simultaneously. In the full prepolymer procedure, the isocyanate is reacted with the high molecular weight glycol to prepare an isocyanate-terminated prepolymer which is then reacted with the two low molecular weight diols. In the quasi-prepolymer procedure, the isocyanate is reacted with a portion of the high molecular weight glycol and in a subsequent step the low molecular weight diols and remaining part of the high molecular weight glycol are all reacted with the prepolymer prepared in the first step.

To insure optical clarity, it is important that the mixture of polymer forming ingredients be heated promptly after mixing and before gelling has commenced and that a urethane forming catalyst be present in the mixture so that the reaction product gels within about an hour. Gellation has occurred if the product does not "string" when a glass rod is inserted and withdrawn from the material at a temperature of about 100° to 115° C. The starting temperature required varies from about 35° to 65° C., depending upon the amount of catalyst and the particular formulation used.

Suitable urethane-forming catalysts are those that are highly specific for the formation of urethanes by reaction of —NCO and —OH groups and that have little tendency to accelerate side reactions leading to allophonate and isocyanurate formation. Catalysts such as stannous salts of organic acids and other organotin compounds are preferred. Illustrative catalysts include stannous octoate, stannous oleate, dibutyltin diacetate, and dibutyltin dilaurate. Preferred catalysts are tin-IV catalysts, such as UL-28, marketed by Witco. While the tin salt and organo tin catalysts are preferred, other catalysts can be used. The preferred UL-28 is usually employed in the amount of about 4 to about 10 ppm by weight.

The polyurethanes of this invention are optically clear or transparent as opposed to translucent or opaque. The polyurethane is light transmitting, transmitting over 50% of visible light, and preferably over 90% of visible light when it is in a thickness of ¼ inch. They are colorless or substantially colorless and remain that way indefinitely. Moreover, the polymers are highly impact resistant and have excellent physical properties. They are useful in manufacturing see-through security glazings. Examples include impact resistant windshields and side windows for vehicles such as automobiles, aircraft, railroad automotives, military vehicles, and armored vehicles. These laminates can also be used in correctional facilities and military installations, and in store windows, display cases, offices and homes. Because of the low laminating temperature, they can be used to manufacture thin (i.e. ¼ inch and less in thickness), three-layer, flat and curved asymmetrical laminates, products not available before.

The polyurethane is preferably in sheet form with a thickness of from about 10 to about 100 mils, and preferably from about 25 to about 50 mils.

The polyurethane can be used in laminates that in a thickness of ¼ inch transmit at least 8% visible light for applications such as one-way mirrors. Preferably the laminate transmits at least 50% visible light, and more preferably at least 85% of the visible light. In the claims herein, when light transmission properties are given, reference is made to a layer or laminate ¼ inch thick.

The polyurethane can be used to laminate rigid sheets such as sheets of glass, ceramic, and plastic. Exemplary of the plastics for which the polyurethane can be used are the following: polyetherimides, acrylics, polysulfones, polycarbonates, polyester-polycarbonate copolymers, polyamides, and polyarylates. The layers laminated by the polyurethane are preferably in sheet form with a thickness of from about 60 mils to about 1 inch. Generally the laminate contains dissimilar materials having different coefficients of expansion to take advantage of the ability of the polyurethane to laminate at low temperatures and pressures without distortion of the laminate.

The inherent viscosity of a 1% solution of the polyurethane preferably is greater than 0.8. The viscosity of such a solution is measured on an Ubbelohde No. 1 viscometer. The inherent viscosity is defined as:

$$\ln (Ts/Tt)$$

where
  Ts = flow time of the solution and
  Tt = flow time of pure THF.

Preferably the polyurethane has the following physical properties:
  Tensile at Break, psi: 3000–7000
  Elongation at Break, %: 400–700
  100% Modulus, psi: 300–800
  300% Modulus, psi: 1000–2000
  Hardness, Shore A: above 50

These properties are measured in accordance with the following ASTM procedures:
  Tensile Strength: D412
  Elongation at Break: D412
  Modulus: D412
  Hardness, Shore A: D676

Essentially, this two diol polyurethane has physical, optical, and laminating properties comparable to those of some of the best one diol polyurethanes. Furthermore, it has the advantage of being able to laminate at below 150° F. at pressures less than 200 psig..

To test the strength and low temperature laminating characteristics of this polyurethane, test laminates are prepared. The test laminates measure 5 inch by 10 inches. A 15 mil thick non-primed sheet of polycarbonate is laminated to a 50 mil thick layer of polyurethane at 220° F. and a pressure of 100 psig. This laminate is then laminated to a test material, such as glass (primed), polycarbonate (primed), or other material. Lamination occurs in an autoclave at a temperature of 135°–150° F. and a pressure of 150 psig for a period of two hours or more. The laminate is then set aside for one day after the lamination. Before the lamination process, a 1 inch by 5 inch silicone tape is placed across the top of one end of the test material. This serves as a separator to keep the polyurethane from adhering to the test material in that area. Cuts are made in the 15 ml thick polycarbonate through the polyurethane layer to the test material. The cuts are spaced one-half inch apart. The half-inch strips so formed are used in testing.

Two kinds of peel tests, room temperature and high temperature, are performed to determine the adhesion characteristics of the polyurethane in the laminate system. A satisfactory laminate withstands a peel of at least 2 pounds per linear inch (pli), that is 1 pound applied on a ½ inch strip, without any delamination movement. Preferably no delamination occurs at 10 pli.

In the high temperature peel test, the above procedure is repeated at 160° F., with a constant 6 pound force on a ½ inch strip (12 pli). A satisfactory polyurethane is one where the strip peels at a speed of less than 1 inch per hour.

Preferably the polyurethane has a shore A hardness of at least about 60, and more preferably at least about 70, to consistently be capable of laminating to glass and polycarbonate.

Laminates according to the present invention can require a primer. Polyurethane does not laminate properly to glass without a primer. It can adhere to polycarbonate without a primer at a laminating temperature of above 200° F., but generally not at low lamination temperatures.

U.S. Pat. No. 3,350,345, issued to Vanderbilt et al. teaches the use of hydrolyzed silanes as primers for binding rubbery polymers to glass surfaces. Preferred primers for use in laminates according to the present invention are as follows:

TABLE 1

| Ingredient | Polycarbonate Primer | Glass Primer |
|---|---|---|
| A-151 | — | 0.5 |
| A-1120 | 1.74 | 4.5 |
| DER-661 | 8.26 | — |
| Water | 400 | 2450 |
| Isopropyl alcohol | 1795 | 2540 |
| Diacetone alcohol | 1795 | — |
| Cellosolve TM | — | 8 |

A-151 is vinyltriethoxysilane available from Union Carbide, having a formula molecular weight of 190.4. It is a clear liquid with a refractive index of 1.397 ($N_D25°$ C.), a specific gravity of 0.905 at 25° C., and a boiling point of 160.5° C.

A-1120 is N-beta-(Aminoethyl)-gamma-aminopropyltrimethoxysilane from Union Carbide, having a formula molecular weight of 222.4. It is a clear liquid, with a refractive index of 1.448 ($N_D25°$ C.), a specific gravity of 1.03 at 25° C., and a boiling point of 259° C.

DER-661 is a solid epoxy resin marketed by Dow Chemical. It is the reaction product of epichlorohydrin and bisphenol-A, containing 3 of the repeating unit. It has an epoxy equivalent weight (grams of resin containing one gram equivalent weight of epoxide) of 475 to 575. It has a specific gravity of 1.19. A solution of DER-661 in DOWANOL DB TM glycol ether solvent, containing 40 weight % of the resin, has a color of 1 (Gardner Color Standard of 1933).

The primers are applied to glass or polycarbonate by pouring or spraying a small quantity on the surface. The applied primer is then wiped dry by lightly buffing with a clean lint free cloth, covering the entire surface.

A method for preparing commercial glass/polyurethane/polycarbonate laminates according to the present invention is as follows: Primers are used as required to treat the surfaces of the glass and polycarbonate sheets. The sheets are assembled one on top of the other, with the polyurethane sheet sandwiched between the other two sheets. The assembled laminate is vacuum bagged and autoclaved and heated to a lamination temperature less than 150° F. and a pressure of about 50 psi to 200 psi for a suitable time, for example about 1 to 3 hours.

EXAMPLE

The raw materials used in a preferred formulation are as follows:
1. Teracol 1000 TM —This is in a polyether glycol marketed by Du Pont. It has a molecular weight of 950–1050, a hydroxyl number of 107 to 118, an APHA color of less than 40, an alkalinity number of less than 1 meq. KOH/kg×30, an acid number (hot) of less than 0.05 mg KOH/g., and a water content of less than 0.03 weight %.
2. A combination of 1,4-butanediol and ethylene glycol is used as the low molecular weight diols. A ratio of about 60% of butanediol to 40% of ethylene glycol yields a polyurethane with the desired properties.
3. Desmodor W TM is 4,4'-diisocyanate-dicyclohexylmethane and is marketed by The Mobay Chemical Company.

In the preferred formulation, the high molecular weight glycol provided about 40% of the functional —OH groups, with the two diols providing the remainder. As between the two diols, ethylene glycol provided about 40% of the total —OH groups provided by the two diols.

The amounts of the materials used were:

| | Equivalents |
|---|---|
| Teracol - 1000 | 0.1747 |
| 1,4-butane diol | 0.1667 |
| Ethylene Glycol | 0.1111 |
| Desmodor W | 0.4593 |

Stoichiometrically, the equivalent amount of the diisocyanate is the sum of the equivalent amounts of the glycol and diols. A slightly larger amount (less than 2%) of Desmodor W was used to compensate for the stated 99.3% purity of the chemical and the fact that there is water present in the glycol and diols.

The manufacturing process was as follows: Teracol 1000 was stirred well in the reaction kettle. Any antioxidants used were then added. The butanediol, ethylene glycol, and Desmodor W were added in that order. The batch was mixed for five minutes at 90° F. Seven ppm of a Tin-IV catalyst, UL-28, marketed by Witco, were then added. The batch was stirred for another 10 minutes at about 90° F. The resultant polyurethane was then poured into a casting mold. It was cured in an oven at 200° F. for at least 6 hours.

The cured block of polyurethane was guillotined, granulated, and extruded at a temperature between 300° and 350° F. into a 50 mil sheet.

This polyurethane sheet had a refractive index of about 1.5 and was optically transparent. Because it was manufactured with an aliphatic diisocyanate, it did not yellow on aging. A 50 mil sheet of this material can transmit more than 90% of visible light. This material was capable of laminating to polycarbonate and glass at a temperature of 140° F. and a pressure of 150 psig, the laminate being ¼ inch thick. Both flat and curved laminates were formed without distortion.

This material can also be used to form bullet proof glass. Two sheets of glass, each ¼ to ⅜ inch thick are laminated together with polyvinylbutyral. Then the glass laminate is laminated to ¼ inch polycarbonate with the polyurethane sheet.

Although the present invention has been described in considerable detail with reference to certain preferred versions thereof, other versions are possible. For example, low temperature laminating polyurethanes according to the present invention can contain more than two low molecular weight diols. Therefore, the spirit and scope of the appended claims should not necessarily be limited to the description of the preferred versions contained herein.

What is claimed is:
1. A window glass article capable of transmitting at least 8% of visible light comprising (i) a layer of polyurethane, sandwiched between (ii) a layer of a first material and (iii) a layer of a second material, where the first and second materials can be the same or different, and are selected from the group consisting of light transmitting glass, plastic, and ceramic; the polyure- thane having been cured prior to being sandwiched between the first and second materials by a curing reaction which is carried out essentially in absence of aromatic amines the polyurethane having a Shore A hardness of at least about 60, and being capable of laminating to the other two layers at a lamination temperature below 150° F. and a pressure below 200 psig so that the article does not delaminate at room temperature at 2 pli.

2. The window glass of claim 1 wherein the coefficient of thermal expansion of the first material is at least about five times the coefficient of thermal expansion of the second material within the temperature range of from 180° F. to 200° F.

3. The window glass of claim 2 wherein the first material is polycarbonate and the second material is glass.

4. The glass of claim 2 wherein the article is curved.

5. The glass of claim 2 wherein the glass is flat and consists essentially of only the three layers.

6. The glass of claim 5 no more than about ¼ inch in thickness.

7. The glass of claim 1 wherein the article delaminates at 160° F. at a rate of less than 1 inch per hour at 12 pli.

8. The window glass of claim 1, further comprising primer between the polyurethane layer and one of the two other layers.

9. The window glass of claim 1 capable of transmitting at least 50% of visible light.

10. The window glass of claim 1 capable of transmitting at least 85% of visible light.

11. The window glass of claim 1 wherein the polyurethane layer:
(a) is capable of transmitting at least about 90% of visible light;
(b) has an index of refraction between about 1.4 and about 1.6;
(c) a 100% modulus of from about 300 to about 800 psi;
(d) a 300% modulus of from about 1,000 to about 2,000 psi;
(e) a tensile strength at break of from about 3,000 to about 7,000 psi; and
(f) an elongation at break of from about 400 to about 700%.

12. The glass of claim 1 wherein the polyurethane is thermoplastic.

13. The window glass of claim 1 wherein the polyurethane is prepared by reacting in the presence of a urethane-forming catalyst:
(a) a high molecular weight polyether glycol or polyester glycol melting below 120° F., and having a molecular weight of from about 500 to about 3,000;
(b) at least two diols, (i) a first diol having a molecular weight of from about 60 to about 250, the first diol being symmetrical, and (ii) a second diol having a molecular weight of from about 60 to about 250, the second diol being different from the first diol; and
(c) diisocyanate in an amount substantially equivalent to the equivalents of (a)+(b);

wherein from about 30 to about 60% of the functional —OH groups are provided by the glycol.

14. The glass of claim 13 wherein from about 40 to about 70% of the functional —OH groups come from the diols with the second diol providing from about 10 to about 60% of the total —OH groups provided by the two diols.

15. The glass of claim 13 wherein the diols are both reinforcing and differ in molecular weight by at least 14.

16. The glass window of claim 13 where the high molecular weight glycol is a polyether glycol having a molecular weight of from about 950 to about 1050, a hydroxyl number of from about 107 to about 118, an APHA color of less than 40, an alkalinity number of less than 1 meq. KOH/kg×30, an acid no. (hot) of less than 0.05 mg KOH/g, and water content of less than 0.03 wt.%, the first diol is 1,4-butanediol, the second diol is ethylene glycol, and the diisocyanate is methylene bis(4-cyclohexylisocyanate).

17. The glass of claim 13 wherein the equivalent amounts of the glycol:first diol:second diol:diisocyanate are about 1:1:0.6:2.6.

18. A flat window glass article capable of transmitting at least 50% of visible light consisting essentially of three layers: a layer of polyurethane, sandwiched between a layer of a first material and a layer of a second material, where the first and second materials are different, and are selected from the group consisting of glass and plastic; the coefficient of thermal expansion of the first material is at least about five times the coefficient of thermal expansion of the second material within the temperature range of from 100° F. to 200° F.; the polyurethane having been cured prior to being sandwiched between the first and second materials by a curing reaction which is carried out essentially in the absence of aromatic amines, the polyurethane having a Shore A hardness of at least about 70, and being capable of laminating to the other two layers at a lamination temperature below 150° F. and a pressure below 200 psig so that the article does not delaminate at room temperature at 2 pli; the polyurethane being prepared by reacting in the presence of a urethane-forming catalyst;
(a) a high molecular weight polyether glycol or polyester glycol melting below 120° F., and having a molecular weight of from about 500 to about 3,000;
(b) a first symmetrical diol having a molecular weight of from about 74 to about 250;
(c) a second symmetrical diol having a molecular weight of from about 60 to about 236, the molecular weight of the second diol being at least about 14 less than the molecular weight of the first diol; and
(d) an aliphatic diisocyanate in an amount substantially equivalent to the equivalents of (a)+(b)+(c);
the proportions of (a), (b), and (c) being such that from about 30 to about 60% of the functional —OH groups come from the polyether glycol or polyester glycol (a), and from about 40 to about 70% from the two diols (b) and (c), with the second diol (c) providing from about 30 to about 50% of the total —OH groups provided by the two diols.

* * * * *